(12) United States Patent
Kim

(10) Patent No.: US 9,055,208 B2
(45) Date of Patent: Jun. 9, 2015

(54) CAMERA MODULE

(71) Applicant: LG INNOTEK CO., LTD., Seoul (KR)

(72) Inventor: Hack Ho Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 146 days.

(21) Appl. No.: 13/801,221

(22) Filed: Mar. 13, 2013

(65) Prior Publication Data

US 2013/0250169 A1    Sep. 26, 2013

(30) Foreign Application Priority Data

Mar. 21, 2012  (KR) .................. 10-2012-0028565

(51) Int. Cl.
*H04N 5/225*   (2006.01)
*H04N 5/232*   (2006.01)

(52) U.S. Cl.
CPC ........... *H04N 5/2254* (2013.01); *H04N 5/2253* (2013.01); *H04N 5/2257* (2013.01); *H04N 5/23212* (2013.01); *H04N 5/2328* (2013.01)

(58) Field of Classification Search
CPC .......... H04N 5/23287; H04N 5/23212; H04N 5/2253; H04N 5/2257
USPC ............ 348/208.99, 208.7, 208.12, 345, 351, 348/357, 373, 374
See application file for complete search history.

(56) References Cited

U.S. PATENT DOCUMENTS

| | | | | |
|---|---|---|---|---|
| 4,947,239 | A * | 8/1990 | Kondou et al. | 257/680 |
| 5,101,278 | A * | 3/1992 | Itsumi et al. | 348/357 |
| 6,437,485 | B1 * | 8/2002 | Johansson | 310/332 |
| 7,005,781 | B2 * | 2/2006 | Smits | 310/331 |
| 7,992,271 | B2 * | 8/2011 | Mehta | 29/25.35 |
| 8,040,426 | B2 * | 10/2011 | Zhou | 348/345 |
| 2002/0021651 | A1 * | 2/2002 | Hong et al. | 369/112.23 |
| 2004/0195920 | A1 * | 10/2004 | Matsumoto | 310/12 |
| 2005/0146633 | A1 * | 7/2005 | Kuo et al. | 348/345 |
| 2006/0012836 | A1 * | 1/2006 | Boemler | 358/474 |
| 2007/0284968 | A1 * | 12/2007 | Takeuchi | 310/332 |
| 2008/0174205 | A1 * | 7/2008 | Iino | 310/317 |
| 2008/0284860 | A1 * | 11/2008 | Wu et al. | 348/208.7 |
| 2009/0002500 | A1 * | 1/2009 | Kawai et al. | 348/208.11 |
| 2009/0002825 | A1 * | 1/2009 | Morita et al. | 359/554 |
| 2009/0185067 | A1 * | 7/2009 | Cho et al. | 348/345 |
| 2012/0188639 | A1 * | 7/2012 | Urakami et al. | 359/508 |
| 2012/0268642 | A1 * | 10/2012 | Kawai | 348/335 |
| 2013/0193303 | A1 * | 8/2013 | Smith et al. | 250/203.6 |

* cited by examiner

*Primary Examiner* — Timothy J Henn
(74) *Attorney, Agent, or Firm* — Birch, Stewart, Kolasch & Birch LLP

(57) ABSTRACT

A camera module according to an exemplary embodiment of the present disclosure includes a housing forming an exterior appearance of the camera module, a PCB (Printed Circuit Board) mounted with an image sensor where one end of which is fixed to the housing and the other end is exposed to an outside to be connected to other parts, a lens holder including at least one or more pieces of lenses and so arranged as to be spaced apart from the image sensor at a predetermined distance, and at least two actuators mounted at areas other than an image sensor-mounted area of the PCB, wherein a position of the image sensor is controlled in response to strains of the actuators.

18 Claims, 5 Drawing Sheets

CAMERA MODULE

Pursuant to 35 U.S.C. §119 (a), this application claims the benefit of earlier filing date and right of priority to Korean Patent Application No. 10-2012-0028565, filed on Mar. 21, 2012, the contents of which are hereby incorporated by reference in their entirety.

BACKGROUND OF THE DISCLOSURE

1. Field of Endeavor

The teachings in accordance with exemplary and non-limiting embodiments of this disclosure relate generally to a camera module.

2. Background

This section provides background information related to the present disclosure which is not necessarily prior art.

Recently, small-sized camera modules are highly demanded in a variety of multimedia fields, such as tablet computers, camera phones, PDAs (Personal Digital Assistants), smart phones, and toys, and image input devices, such as monitoring cameras and information terminals of video tape recorders. Particularly, trends are to develop miniaturized camera modules for smart phones in response to increased demands by consumers preferring a small-sized design.

The camera module is manufactured using an image sensor such as a charge coupled device (CCD) or a complementary metal oxide semiconductor (CMOS), where light of an object is concentrated through a lens to the image sensor, and an optical signal is converted into an electrical signal for display on a display unit such as an LCD display device.

The camera module includes a plurality of lenses, and adjusts an optical focal length by changing a relative distance while being mounted with a driving source to move respective lenses. A VCM (Voice Coil Motor) is commonly used to implement an autofocus function, but the VCM suffers from disadvantages in that it is voluminous and limited in accurate control and miniaturization of camera module.

SUMMARY OF THE DISCLOSURE

This section provides a general summary of the disclosure, and is not a comprehensive disclosure of its full scope or all of its features.

Exemplary embodiments of the present disclosure are provided to solve the aforementioned technical problems, configured to improve a structure of the camera module for implementing an auto focusing function by moving an image sensor relatively lighter than a lens, and to enable a miniaturization over a conventional camera module.

Exemplary embodiments of the present disclosure are also provided to compensate a user handshake by lifting and tilting controls of an image sensor.

It should be emphasized, however, that the present disclosure is not limited to particular disclosures, as explained above. It should be understood that other technical subjects not mentioned herein may be appreciated by those skilled in the art.

In one general aspect of the present disclosure, there is provided a camera module, a camera module comprising: a PCB (Printed Circuit Board) having an image sensor mounted thereon a housing which is fixed to the PCB; a lens holder including at least one or more pieces of lenses and so arranged as to be spaced apart from the image sensor at a predetermined distance; and at least two actuators disposed at areas other than an image sensor-mounted area of the PCB, wherein a position of the image sensor is controlled according to the actuators.

Preferably, but not necessarily, the actuators may be provided in piezoelectric actuators.

Preferably, but not necessarily, the PCB may be formed with a flexible material.

Preferably, but not necessarily, the image sensor may be controlled in at least one movement of lifting and tilting movements in response to strains of the piezoelectric actuators to enable at least one or more controls of an auto focusing and a handshake compensation control.

Preferably, but not necessarily, the actuators may be symmetrically arranged about the image sensor.

Preferably, but not necessarily, the piezoelectric actuator may include a first piezoelectric actuator and a second piezoelectric actuator, each actuator having same size and directivity.

Preferably, but not necessarily, the actuators may be installed at an opposite side of an image sensor-mounted side of the PCB.

Preferably, but not necessarily, the camera module may further comprise a pair of elastic support members that pass a center of the image sensor, where one end of the pair of elastic support members is fixed to the housing and the other end is connected to the PCB on an imaginary extension line of a direction perpendicular to a center line of the actuator.

Preferably, but not necessarily, the camera module may further comprise a reinforcement member interposed between the PCB and the image sensor.

Preferably, but not necessarily, the camera module may further comprise a reinforcement member a position corresponding to an opposite side of the image sensor-mounted surface of the PCB.

Preferably, but not necessarily, the reinforcement member may be provided with a plate material configured to maintain a predetermined flatness.

Preferably, but not necessarily, the PCB may be supported by the housing and at least two or more areas to maintain a tight state by adding a tension of more than a predetermined size.

Preferably, but not necessarily, the lens holder may be fixed to a position of the housing.

Preferably, but not necessarily, the image sensor and the piezoelectric actuators may be supplied with a power through the PCB.

Preferably, but not necessarily, the first and second piezoelectric actuators may be so mounted as to be strained with same directivity, in a case a power of same size and same polarity is supplied.

Preferably, but not necessarily, the first and second piezoelectric actuators may ascend or descend the image sensor, in a case the first and second piezoelectric actuators are strained to a same direction, and tilt the image sensor, and in a case the first and second piezoelectric actuators are strained to an opposite direction.

Preferably, but not necessarily, deflection of the image sensor may be adjusted in response to size of voltage applied to the first and second piezoelectric actuators.

The camera module according to exemplary embodiments of the present disclosure has an advantageous effect in that size of the camera module can be miniaturized by lifting and tilting a relatively light image sensor to implement an auto focusing function.

Another advantageous effect is that tilting of the image sensor can be controlled to compensate dispersion of focus at a remote isolated portion of the image sensor, in a case the camera module according the exemplary embodiments of the present disclosure is applied to a camera module using a conventional VCM as an auto focusing unit.

BRIEF DESCRIPTION OF THE DRAWINGS

In order to explain the principle of the present disclosure, some accompanying drawings related to its preferred embodiments are below reported for the purpose of illustration, exemplification and description, although they are not intended to be exhaustive. The drawing figures depict one or more exemplary embodiments in accord with the present concepts, by way of example only, not by way of limitations. In the figures, like reference numerals refer to the same or similar elements.

Thus, a wide variety of potential practical and useful embodiments will be more readily understood through the following detailed description of certain exemplary embodiments, with reference to the accompanying exemplary drawings in which.

DETAILED DESCRIPTION

Now, the camera module according to exemplary embodiments of the present invention will be described in detail with reference to the accompanying drawings.

Figure 1:
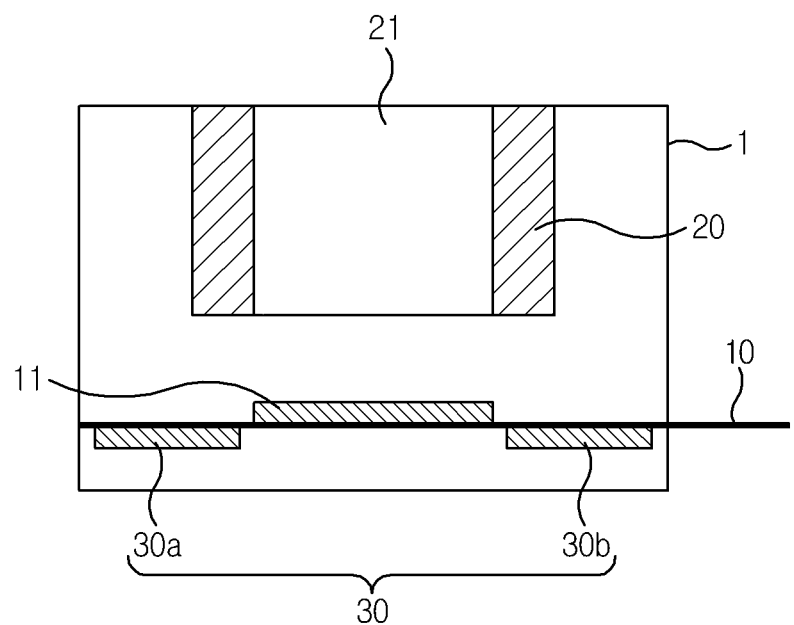
FIG. 1 is a schematic cross-sectional view illustrating a lateral surface of a camera module according to an exemplary embodiment of the present disclosure.
Figure 2:
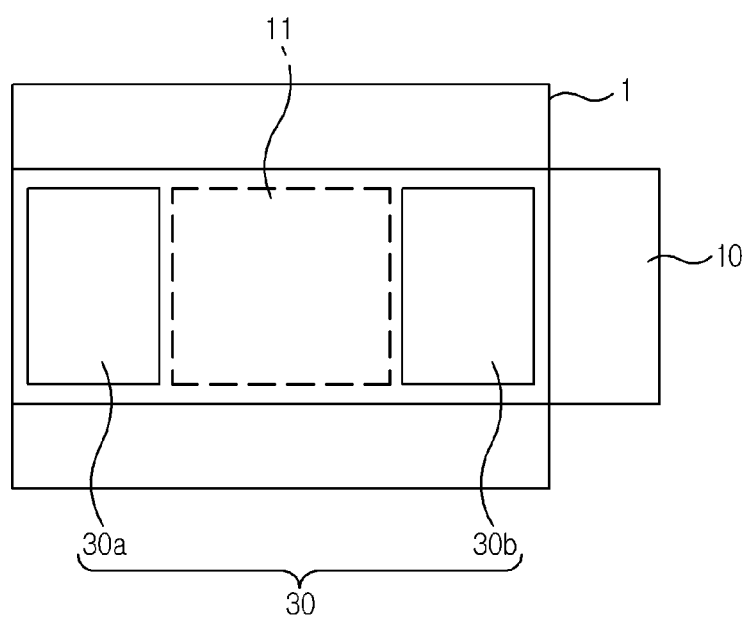
FIG. 2 is a schematic view illustrating a bottom of the camera module of FIG. 1 according to a first exemplary embodiment of the present disclosure.
Figure 3:
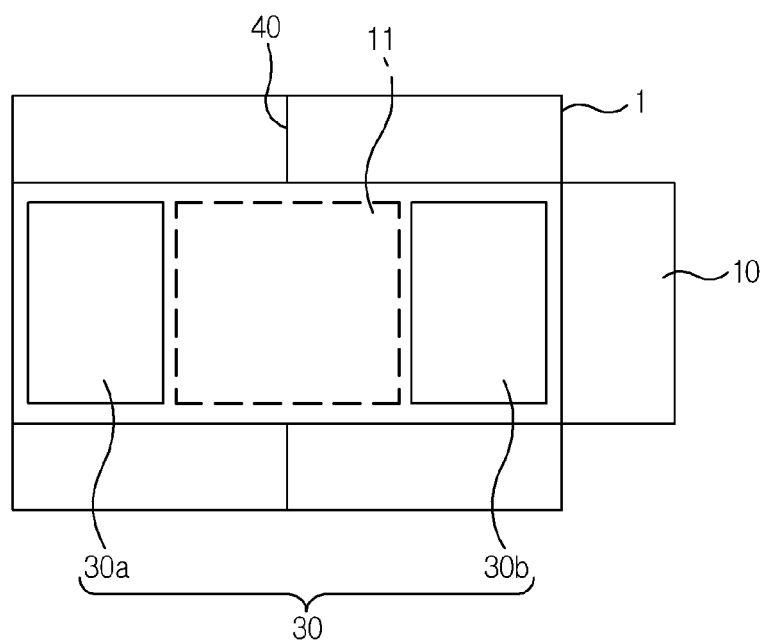
FIG. 3 is a schematic view illustrating a bottom of the camera module of FIG. 1 according to a second exemplary embodiment of the present disclosure.
Figure 4:
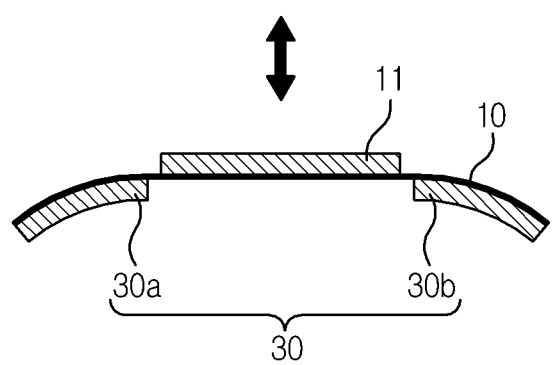
FIG. 4 is a schematic view illustrating an operation of auto focusing function of an image sensor according to an exemplary embodiment of the present disclosure.
Figure 5:
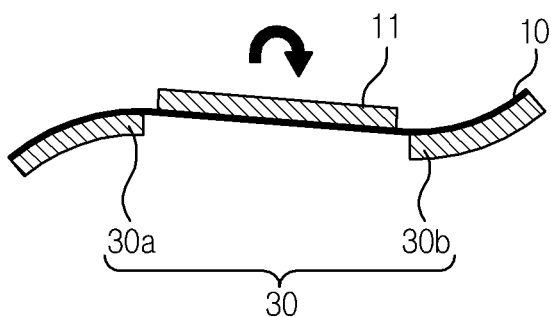
FIG. 5 is a schematic view illustrating an operation of handshake compensation function of an image sensor according to an exemplary embodiment of the present disclosure.
Figure 6:
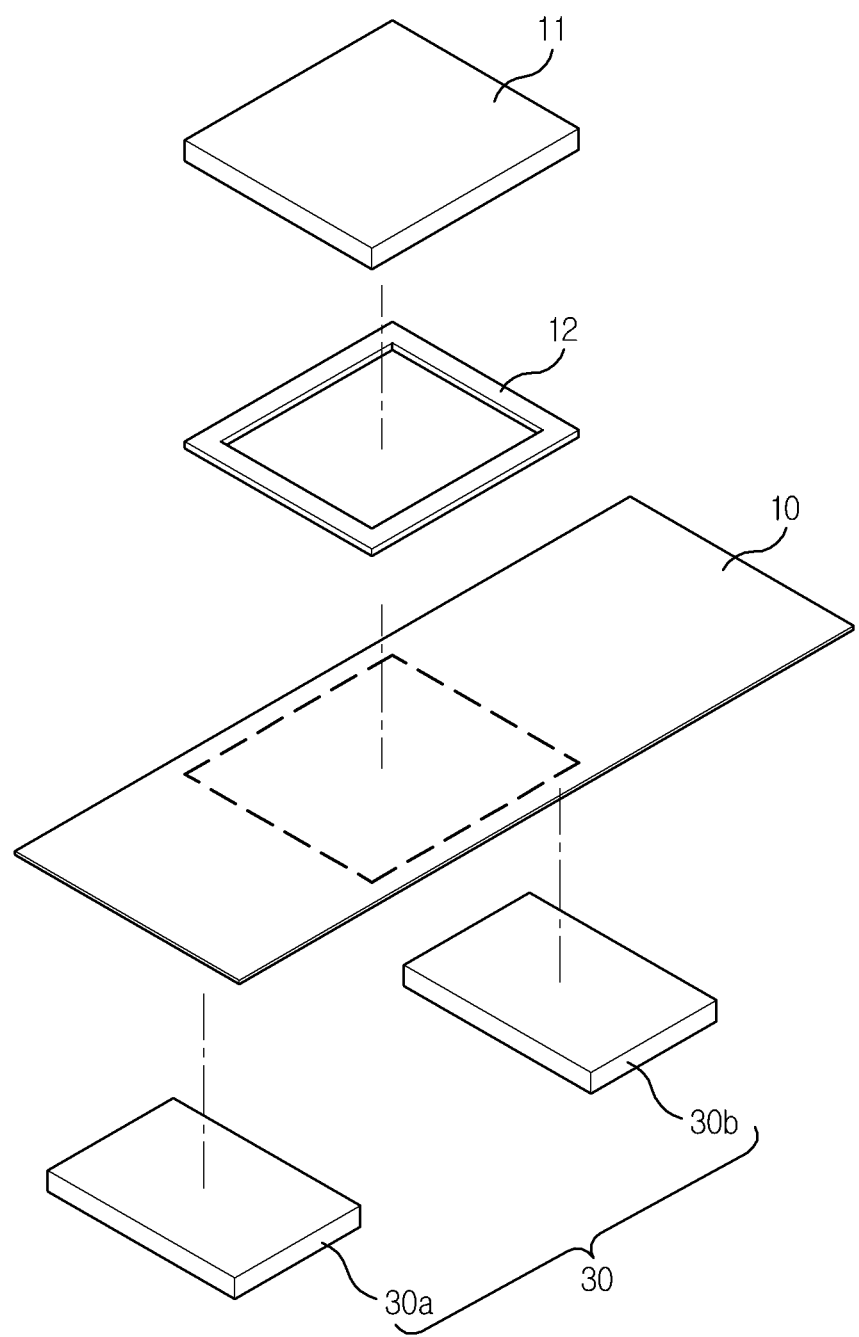
FIG. 6 is a schematic view illustrating a coupled relationship of an image sensor, a reinforcement member and piezoelectric actuators on a PCB of a camera module according to a third exemplary embodiment of the present disclosure.
Figure 7:
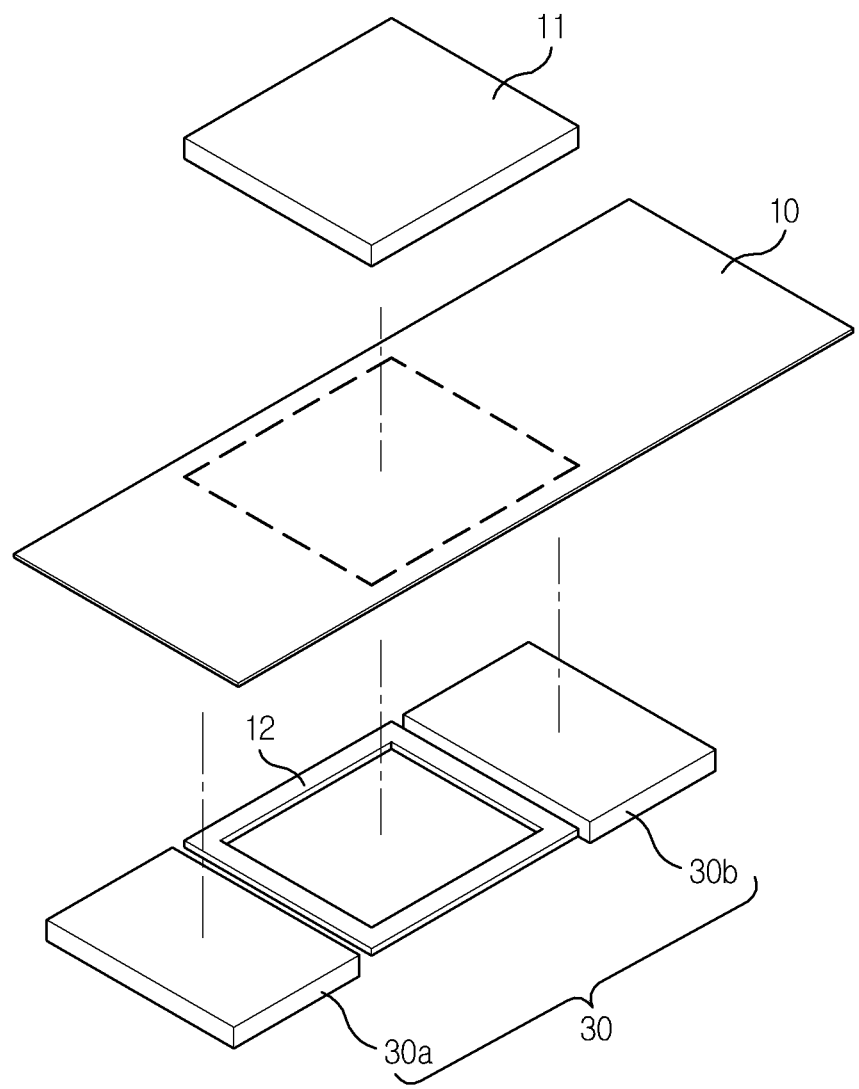
FIG. 7 is a schematic view illustrating a coupled relationship of an image sensor, a reinforcement member and piezoelectric actuators on a PCB of a camera module according to a fourth exemplary embodiment of the present disclosure.

FIG. 1 is a schematic cross-sectional view illustrating a lateral surface of a camera module according to an exemplary embodiment of the present disclosure, FIG. 2 is a schematic view illustrating a bottom of the camera module of FIG. 1 according to a first exemplary embodiment of the present disclosure, FIG. 3 is a schematic view illustrating a bottom of the camera module of FIG. 1 according to a second exemplary embodiment of the present disclosure, FIG. 4 is a schematic view illustrating an operation of auto focusing function of an image sensor according to an exemplary embodiment of the present disclosure, FIG. 5 is a schematic view illustrating an operation of handshake compensation function of an image sensor according to an exemplary embodiment of the present disclosure, FIG. 6 is a schematic view illustrating a coupled relationship of an image sensor, a reinforcement member and piezoelectric actuators on a PCB of a camera module according to a third exemplary embodiment of the present disclosure, and FIG. 7 is a schematic view illustrating a coupled relationship of an image sensor, a reinforcement member and piezoelectric actuators on a PCB of a camera module according to a fourth exemplary embodiment of the present disclosure.

Referring to FIG. 1, the camera module according to an exemplary embodiment of the present disclosure includes a PCB 10, a lens holder 20, a piezoelectric actuator 30, where these constituent parts are preferably installed inside a housing 1.

The housing 1 forms an external appearance of the camera module in a box shape, and is preferably formed therein with a space unit of a predetermined size to accommodate the constituent parts. The housing 1 is also provided with an opening (not shown) configured to open an optical path formed between the lens holder 20 and the image sensor 11.

The PCB 10 is preferably provided with a flexible material. According to an exemplary embodiment of the present disclosure, the PCB 10 is preferably provided in an F-PCB (Flexible PCB) and integrally equipped with an electronic circuit pattern and a plurality of terminals. The PCB 10 is preferably mounted at an upper surface thereof with the image sensor 11, where the image sensor 11 may be directly mounted to the upper surface of the PCB 11 by way of soldering or wire bonding.

The lens holder 20 may be mounted with at least one or more pieces of lenses 21, and is preferably fixed in position to the housing 1.

At least a pair of piezoelectric actuators 30 is mounted at the PCB 10. The pair of piezoelectric actuators 30 moves the PCB 10 to allow the image sensor 11 to lift and/or tilt relative to the lens 21. The piezoelectric actuator 30 may be formed with first and second piezoelectric actuators 30a, 30b, and according to a first exemplary embodiment of the present disclosure illustrated in FIGS. 1 and 2, each of the first and second piezoelectric actuators 30a, 30b is provided in a same size and mounted to the PCB 10 to avoid being interfered with the image sensor 11.

Preferably, the actuators may be installed at an opposite side of an image sensor-mounted side of the PCB 10. Furthermore, the first and second piezoelectric actuators 30a, 30b are spaced apart from the image sensor 11 at a same distance. Operation of the piezoelectric actuators 30 will be described in detail later.

Meantime, according to a second exemplary embodiment of the present disclosure, the PCB 10 may be elastically suspended from the housing 1 by an elastic support member 40. In this case, as illustrated in FIG. 3, the elastic support member 40 passes a center of the image sensor 11 and preferably arranged on an extension line perpendicular to an imaginary line passing a center of the piezoelectric actuator 30.

In a case the elastic support member 40 is installed as described above, the elastic support member 40 can support a horizontal position of the PCB 10 and can provide a restoring force to lifting and/or pivoting, tilting operations of the image sensor 11.

FIGS. 4 and 5 are schematic views illustrating movement of the image sensor 11 in response to the movement of the piezoelectric actuator 30 according to first and second exemplary embodiments of the present disclosure.

Referring to FIG. 4, the PCB 10 mounted with the image sensor 11 may be fixed to at least two portions of the housing 1 in a tight state. Meanwhile, due to the fact that the PCB 10 is formed with a flexible material, portions other than a portion mounted with the image sensor 11 may be bent if the piezoelectric actuator 30 is strained (transformed or deformed).

Furthermore, in a case the first and second piezoelectric actuators 30a, 30b are provided with a power of same size and polarity, the first and second piezoelectric actuators 30a, 30b may be strained (transformed or deformed) to have a same directivity. For example, in a case the first and second piezoelectric actuators 30a, 30b are convexly deflected to an upper side as shown in FIG. 4, the image sensor 11 may be lifted to an arrow direction relative to a reference position as shown in FIG. 4, because both ends of the PCB 10 are fixed by the housing 1, where a lifting height can be adjusted in response to a changing size of voltage applied to the first and second piezoelectric actuators 30a, 30b.

In a case the image sensor 11 is directly lifted as described above, a focal length of the lens 21 can be changed to realize the auto focusing function.

Furthermore, as illustrated in FIG. 5, in a case the first and second piezoelectric actuators 30a, 30b are respectively provided with a power of different size and polarity, the first and second piezoelectric actuators 30a, 30b may be deformed to mutually different directions. For example, as illustrated in FIG. 5, although the first piezoelectric actuator 30a is convexly deformed to an upper side, the second piezoelectric actuator 30b may be concavely transformed to the bottom side, whereby the image sensor 11 may be tilted to an arrow direction as shown in FIG. 5.

Hence, it is possible to finely adjust a focus at a remote cornered area deviated from a center of the image sensor 11 through motion control of the image sensor 11, and it is also possible to controllably shift and tilt the image sensor 11 for user handshake compensation.

As mentioned above, although the PCB 10 is formed with a flexible material, the PCB 10 must maintain as tightened state as possible when installed inside the housing 1 to constantly maintain a flatness of the image sensor 11. In order to further strongly maintain the flatness of the image sensor 11, the camera module according to third and fourth exemplary embodiments of the present disclosure may further include a reinforcement member 12 between the image sensor 11 and the PCB 10, or at a surface opposite to the PCB 10 mounted with the image sensor 11.

That is, as illustrated in FIGS. 6 and 7, the reinforcement member 12 may be provided with a plate member having a same corresponding size as that of the image sensor 11 and a predetermined strength. In consideration of lightness of the product, the reinforcement member 12 may be vacant at a center portion thereof and configured to support only an edge of the image sensor 11.

In a case the reinforcement member 12 is provided as mentioned above, a portion, where the image sensor 11 is mounted, can always maintain a flatness even if the PCB 10 is a bit twisted, and therefore it is possible for an image captured by the image sensor 11 to maintain a predetermined shape.

Meanwhile, albeit not illustrated, it is possible to add a configuration same as the piezoelectric actuator 30 instead of the elastic support member 40. In this case, a finer and/or more elaborate lifting and tilting control of the image sensor may be implemented.

Although the abovementioned exemplary embodiments have explained and described a structure in which the lens holder 20 is fixed to the housing 1, the present disclosure is not limited thereto, such that, albeit not illustrated, a conventional camera module using a VCM as an auto focusing unit may be applied with the configuration according to the exemplary embodiments of the present disclosure, whereby an OIS (Optical Image Stabilization) function can be realized using a simpler structure than that of a conventional handshake compensation module.

Although the present disclosure has been described with reference to a number of illustrative embodiments thereof, it should be understood that numerous other modifications and embodiments can be devised by those skilled in the art that will fall within the spirit and scope of the principles of this disclosure.

What is claimed is:

1. A camera module comprising:
   a PCB (Printed Circuit Board) having an image sensor mounted thereon;
   a housing which is fixed to the PCB;
   a lens holder including at least one or more pieces of lenses and so arranged as to be spaced apart from the image sensor at a predetermined distance;
   at least two actuators disposed at areas other than an image sensor-mounted area of the PCB; and
   a pair of elastic support members that pass a center of the image sensor,
   wherein one end of the pair of elastic support members is fixed to the housing and the other end is connected to the PCB on an imaginary extension line of a direction perpendicular to a center line of the actuator, and
   wherein a position of the image sensor is controlled according to the actuators.

2. The camera module of claim 1, wherein the actuators are provided in piezoelectric actuators.

3. The camera module of claim 1, wherein the PCB is formed with a flexible material.

4. The camera module of claim 2, wherein the image sensor is controlled in at least one movement of lifting and tilting movements in response to strains of the piezoelectric actuators to enable at least one or more controls of an auto focusing and a handshake compensation control.

5. The camera module of claim 1, wherein the actuators are symmetrically arranged about the image sensor.

6. The camera module of claim 2, wherein the piezoelectric actuator includes a first piezoelectric actuator and a second piezoelectric actuator, each actuator having same size and directivity.

7. The camera module of claim 1, wherein the actuators are installed at an opposite side of an image sensor-mounted side of the PCB.

8. The camera module of claim 2, wherein the actuators are installed at an opposite side of an image sensor-mounted side of the PCB.

9. The camera module of claim 1, further comprising a reinforcement member interposed between the PCB and the image sensor.

10. The camera module of claim 1, further comprising a reinforcement member interposed at a position corresponding to an opposite side of the image sensor-mounted surface of the PCB.

11. The camera module of claim 9, wherein the reinforcement member is provided with a plate material configured to maintain a predetermined flatness.

12. The camera module of claim 10, wherein the reinforcement member is provided with a plate material configured to maintain a predetermined flatness.

13. The camera module of claim 1, wherein the PCB is supported by the housing and at least two or more areas to maintain a tight state by adding a tension of more than a predetermined size.

14. The camera module of claim 1, wherein the lens holder is fixed to a position of the housing.

15. The camera module of claim 2, wherein the image sensor and the piezoelectric actuators are supplied with a power through the PCB.

16. The camera module of claim 6, wherein the first and second piezoelectric actuators are so mounted as to be strained with same directivity, in a case a power of same size and same polarity is supplied.

17. The camera module of claim 6, wherein the first and second piezoelectric actuators ascend or descend the image sensor, in a case the first and second piezoelectric actuators are strained to a same direction, and tilt the image sensor, in a case the first and second piezoelectric actuators are strained to an opposite direction.

18. The camera module of claim 17, wherein deflection of the image sensor is adjusted in response to size of voltage applied to the first and second piezoelectric actuators.

\* \* \* \* \*